March 28, 1961 A. SCHATZSCHOCK ET AL 2,976,747
METHOD FOR FORMING FILING TOOLS
Original Filed Aug. 25, 1953 3 Sheets-Sheet 3
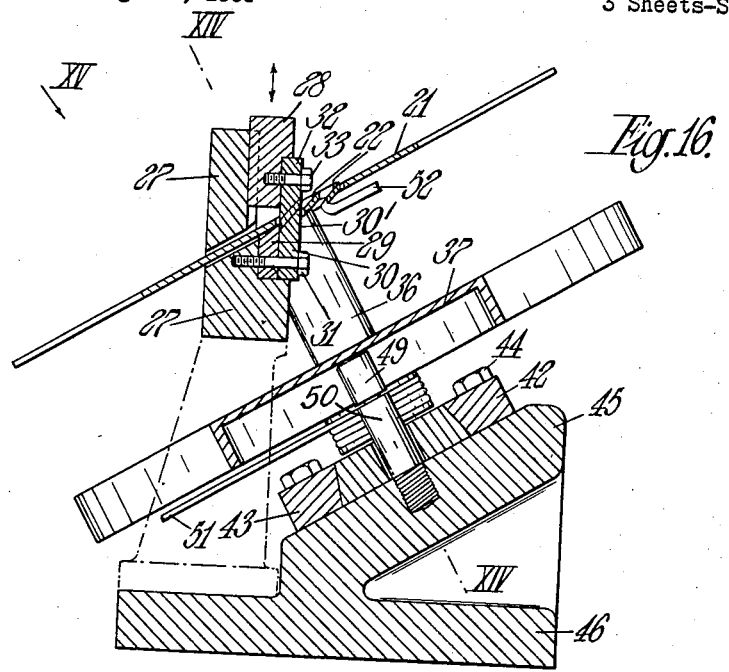

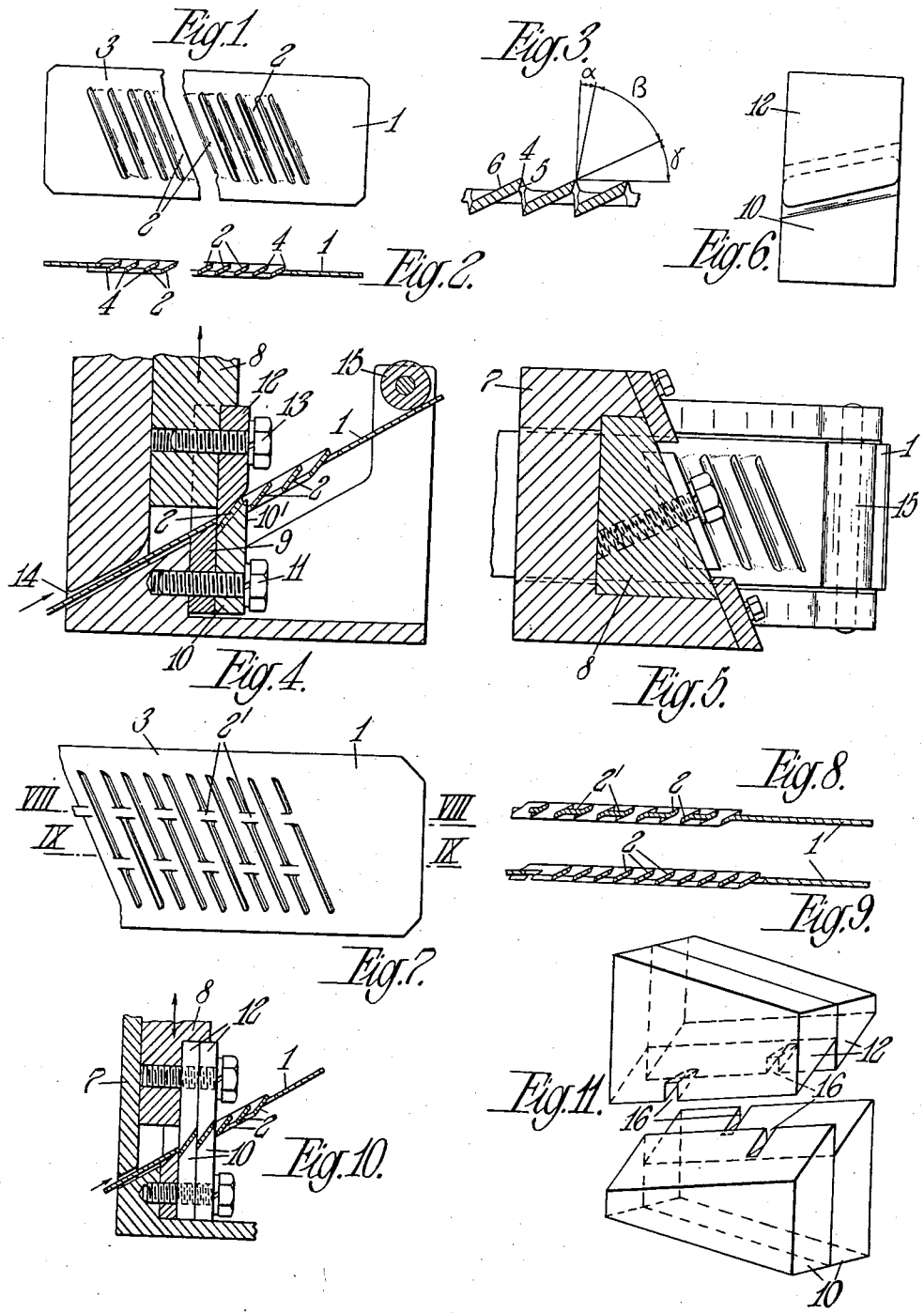

United States Patent Office 2,976,747
Patented Mar. 28, 1961

2,976,747

METHOD FOR FORMING FILING TOOLS

Adolf Schatzschock, Rotenhofgasse 59, Vienna X, Austria, and Alois Weitzel, Hartmanngasse 15, Vienna V, Austria Original application Aug. 25, 1953, Ser. No. 376,448. Divided and this application Oct. 14, 1958, Ser. No. 767,127

Claims priority, application Austria Aug. 29, 1952

6 Claims. (Cl. 76—101)

This invention relates to a method of forming filing tools such as filing plates for hand files or for filing machines, disc files, drum files or the like, and relates more particularly to a method for forming such tools from sheet metal to provide the same with strip-shaped portions of the sheet metal bent out from the surface of the sheet, the edges of which portions form the cutting edges of the tool.

This application is a division of copending application Serial No. 376,448, filed August 25, 1953.

It is an object of the invention to provide an improved method for forming filing tools which overcomes the disadvantages of methods previously used in forming filing plates of the prior art, which results in the production of a filing plate having superior cutting ability, better wearing qualities and other advantages, and which simplifies and reduces the cost of the manufacture of the filing plate and thereby widens the field of application for such filing plates. Included in this object is the provision of a method for forming filing plates which is also adapted to produce similar filing tools such as disc files, abrading bands, drum files or the like.

The filing tools produced by the method of the present invention comprise a metal sheet which may be plane or arcuate, which is provided with strips bent out from the original sheet and having rhomboidal outlines. These strips are connected at their ends and inclined to the sheet and include with same an angle equal to the free angle, i.e., the angle included by the free surface or back surface of the cutter with the surface of the workpiece operated on and moreover these strips are provided along their lengthwise sides with cutting blades, the lower face of which includes with the back or upper surface an angle smaller than 90°. In the construction, adjacent strips may be connected by bridges or webs in staggered relation. Independently thereof it is possible to construct the marginal zones in bandlike metal sheets angularly.

In the method according to the invention, it is not necessary to bend the strips by an angle of at least 60° out of the original sheet surface as customary in known files, but the strips are bent to an extent that a sufficient slit between the strips for the passage of the chips originates. This angle excepting special cases amounts to about 20° to 30°. Therefore, the material of which the tool is made is not as highly stressed at the spots of transition from the sheet to the strip as in prior art files. With certainty the strips will not break at these spots.

Moreover, it is possible to produce the tools in a simpler and cheaper manner, because the surface parts disposed in the sheet prior to bending the strips after bending the strips outwardly can constitute the free or upper faces, also called back faces, and the surfaces of separation of the strips can constitute the breast or lower face of the cutting blade. In the simplified production the use of cutting devices for cutting and bending the strips suffice, a grinding or sharpening operation of the cutting blade in another manner not being necessary.

In accordance with the method of the present invention, metal plates which already have the shape of the tool are provided with strips connected to the plates at their extremities, which strips are produced singly, in pairs or in groups by means of cuts made obliquely to the plane of the plate. These strips are then brought by pressing, into a position which is inclined in relation to the plane of the plate at an angle of inclination as described above. After this the tool is subjected to such heat treatment as may be necessary. Filing plates, e.g. for hand files are produced from a metal sheet which is cut transversely except for its marginal zones, in the manner described above. Alternately, the sheet may be rolled to form a rotating body such as a hollow cylinder, a hollow truncated cone or the like, and the adjacent marginal portions are welded together, and finally the tool is subjected to any heat treatment which may be necessary.

Preferably, the strip or a pair of strips are first separated from the rest of the sheet by a cutting operation except for the connecting parts, and are then brought into the inclined position in relation to the surface of the sheet by a pressing operation, after which the next strip or pair of strips is produced in the same manner. The cutting and pressing of the strips or pair of strips may take place in one operation. However, it is also possible to cut all the strips first and then to bend all the strips out. In order to restore the marginal zones of filing plates to their original toughness, they may be annealed.

In the practice of the method of the invention, a cutting device is used in which the metal sheet is disposed at an acute angle with the direction of the cutting knife. If a counter-die is provided which cooperates with the cutting knife, the strips are bent out of the surface of the sheet in one operation with the cutting. In order to be able to produce filing tools with strips which are connected together by means of staggered links, two cutting knives and two counter-dies are provided, the cutting edges of which are broken by grooves.

The drawing shows, by way of example, several embodiments of filing plates which may be produced by the method of the present invention and cutting devices used in the method for the production of filing tools according to the invention.

In the drawings:

Fig. 1 is a plan view of one embodiment of a filing tool made in accordance with the method of the present invention;

Fig. 2 is a longitudinal cross-sectional view of the tool shown in Fig. 1;

Fig. 3 is an enlarged fragmentary cross-sectional view taken perpendicular to the transverse strips of the tool shown in Fig. 1;

Fig. 4 is a fragmentary vertical cross-sectional view of a cutting device which may be used in carrying out the method of the invention;

Fig. 5 is a horizontal cross-sectional view of the cutting device shown in Fig. 4;

Fig. 6 is a front view of the knife and counter-die used in the cutting device of Fig. 4;

Fig. 7 is a fragmentary plan view of a modified form of filing tool made in accordance with the method of the present invention;

Fig. 8 is a cross-sectional view taken along the line VIII—VIII of Fig. 7;

Fig. 9 is a cross-sectional view taken along the line IX—IX of Fig. 7;

Fig. 10 is a fragmentary vertical cross-sectional view of a double knife and double counter-die for use in the cutting device of Fig. 4;

Fig. 11 is a perspective view of the double knife and double counter-die shown in Fig. 10;

Fig. 12 is a fragmentary perspective view partially in cross section of a modified form of a filing tool which may be produced by the method of the present invention;

Fig. 13 is a fragmentary perspective view partially in cross section of a further modified form of the tool;

Fig. 16 is a vertical cross-sectional view taken substantially along the line XVI—XVI of Fig. 15;

Fig. 17 is a fragmentary cross-sectional view of a cutting device for use in the production of drum files in accordance with the method of the present invention.

Figure 14:
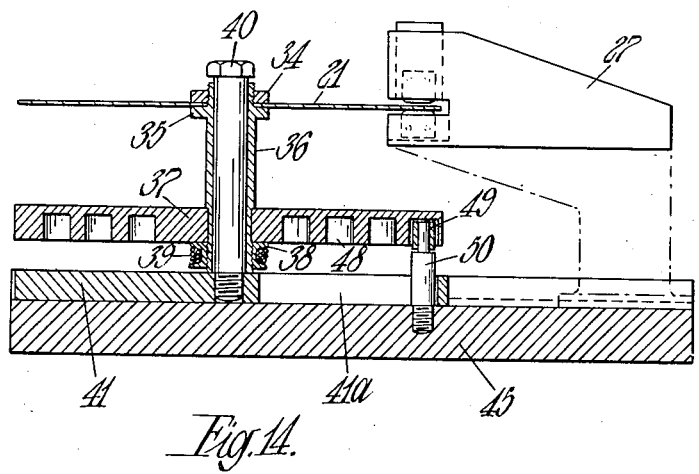
Fig. 14 is a cross-sectional view of a cutting device for use in producing disc-type filing tools in accordance with the method of the present invention, this view being taken along the line XIV—XIV of Fig. 16.

1 represents the metal sheet out of which the strips 2 are cut at the usual angle, being connected to the marginal zones 3 of the metal sheet only at their extremities. The strips 2 are inclined at an angle of about 25° to the plane of the metal sheet 1. The outer edges 4 of these strips form the cutting edges of the filing plate. As shown in Figure 3, the lip or blade angle $\beta$, that is to say the angle which the face forms with the flank, is about 60° so that the cutting angle $\gamma+\beta$ that is to say the angle which the face of the cutting edge forms with the working surface of the workpiece is 85°. The severed surfaces 5 form the faces and the surfaces 6 which, before the strips were cut out formed the surface of the strip metal, represent the rakes, i.e. the flanks of the cutting edges facing the workpiece. The angle $\gamma$, which the flank of the cutting edge forms with the surface of the workpiece, hereafter called the clearance angle, is thus 25°, the face angle $\alpha$, which the face forms with the normals on the working face of the workpiece, is 5°, Figure 3. The lip angle of 60° is obtained by the fact that in the cutting device as shown in Figures 4 to 6, the metal sheet 1 is conveyed inclined at an angle of 30°, whereas in the normal way the cutting plane, i.e. the plane in which the cutting edge of the cutting knife moves during the operation, is perpendicular to the surface of the workpiece, in the present case the surface of the metal sheet forms the said angle of about 30° with the normals on the cutting plane.

The cutting device consists of a support 7 and, guided in the support, a punch member 8 which is fixed to the press ram of a press. A knife 9 and a counter-die 10 are secured in the support 7 by means of a screw 11 and cooperate with a knife 12 which is connected to the punch member 8 by means of a screw 13. The metal sheet 1 is guided in lateral grooves 14. The front faces of the knife 12 and of the counter-die 10 are inclined in relation to the strip metal 1 by the angle of inclination of the strips 2, and are dimensioned so that, in the lowest position of the punch member 8, there is a space between these two front faces which is equal to the thickness of the metal sheet. Furthermore a roller 15 is rotatably mounted on the support and acts as a holding down device for the metal sheet. The metal sheet is fed intermittently by the press.

When the punch member 8 dscends, the knife 12 severs strips 2 up to the connecting parts with the marginal zone of the metal sheet 1 and, as it reaches its lower dead position, causes the twisting of the strips into a position inclined in relation to the metal sheet. As the punch member 8 rises, after the knife 12 has cleared the metal sheet 1, the latter is fed forward one step, whereupon the severed face of the cutter 2 rests against the face 10' of the counter-die 10 and positions the metal sheet for the beginning of the next cutting operation by the knife 12.

The cutting edges of the knife and of the counter-die are rounded at the ends as shown in Figure 6. By these means a more gentle transition from the cutter 2 to the marginal zones 3 of the metal sheet 1 is achieved.

In the wider filing plates, the strength of the cutters in insufficient to prevent a greater deflection than is permissible. This strength could only be achieved by making the cutters wider, that is to say by making the pitch coarser. In order to avoid this, adjacent cutters are joined together by staggered links 2', as shown in Figures 7 to 9.

In order to produce such filing plates, a cutting device as shown in Figure 10 is used, in which two knives 12 and two counter-dies 10 are provided. The cutting edges of these knives and counter-dies, which in other respects have the same shape as those in the cutting device shown in Figure 4, are provided with two grooves 16 (Fig. 11) which are staggered in relation to one another.

In the files as shown in Figures 12 and 13, the marginal edges of the metal sheet are bent down at right angles to enable recessed workpieces to be machined. For this the metal sheet 1 is first bent over and then stamped in the usual manner in one of the cutting devices described, to form a filing plate. For the production of the filing plate as shown in Figure 12, the knife and counter-die are equally wide and this width corresponds to the full length of the strips 2 between the inner faces of the bent-over marginal zones 3. If the knife 12 is made wider than the counter-die 10 by twice the thickness of the metal sheet, a filing plate as shown in Figure 13 is obtained.

After the strips 2 have been stamped, they are hardened and tempered in the known manner, according to the material used. The soft annealing of the marginal zones may be carried out in a conventional manner, whereupon the filing plate is ready for use without being ground.

Figure 15:
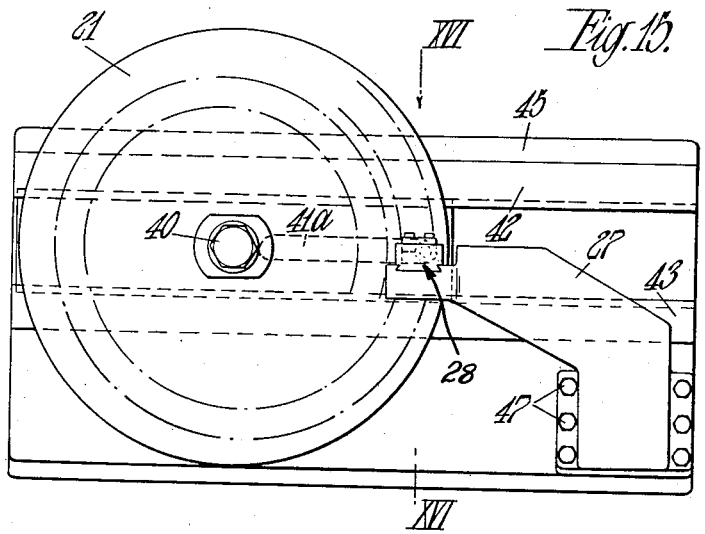
Fig. 15 is a view in the direction of the arrow XV in Fig. 16.

The cutting device for the production of disc files, Figures 14 to 16, consists of a support 27 and the punch member 28 guided therein, which is rigidly connected to the press ram of a press in the usual manner. A knife 29 and a counter-die 30 are secured in the support 27 by means of a screw 31, and cooperate with a knife 32 which is connected to the punch member 28 by means of a screw 33. The front faces of the knife 32 and of the counter-die 30 are inclined in relation to a disc 21 by the angle of inclination of the strips 22, and are dimensioned so that a space equal to the thickness of the disc is left between these two front faces when the punch member 28 is in its lowest position.

The disc 21 is pressed against the boss 35 of a sleeve 36 by means of a nut 34, and is thus firmly connected thereto. At the lower end of the sleeve is a disc 37 which is fast thereon and is secured by means of a nut 38 which has a pulley 39. The sleeve 36 is mounted on a bolt 40 which is screwed into a slide 41. The slide is guided between two guideways 42, 43 which are secured to a bed 45 by means of screws 44. This bed is inclined at about 30° to the horizontal and is made in one piece with the base plate 46, which is clamped to the press table by any suitable known means. The support 27 is either integral with the base plate or is screwed thereto by means of the screws 47 as shown in Figure 15.

The disc 37 is provided on its under surface with a spiral groove 48 in which is engaged a guide roller 49 which is rotatably mounted on a pin 50. This pin passes through a slot 41a in the slide 41 and is screwed into the bed 45.

In the pulley 39 a cord 51 is secured and wound up, being connected to a weight not illustrated. As a result of this weighting, the cord tends to turn the nut 38, the sleeve 36, the disc 37 and the filing disc 21 in a clockwise direction. Turning in this direction is prevented by the fact that the strip just produced is resting against the block 29. In order to enable the disc to be fed a step further and the next strip to be produced, a resilient claw 52 (Figure 16) is provided which is reciprocated in known manner by the press during each operation and causes the stepwise feed by gripping behind one strip each time with its hooked end.

When the punch member 28 descends, the knife 32 severs a strip 22, except for the narrow connecting parts, from the disc 21 and, as it reaches its lower dead position causes the same to twist into a position inclined in relation to the disc. During the ascent of the punch member 28, after the knife 32 has cleared the disc 21, the latter is fed forwards one step by means of the claw 52, against the pull of the cord 51, whereupon the severed surface of the cutters 22 rests against the rear face 30' of the counter-die 30 and positions the sheet at the beginning of the next cutting operation of the knife 32.

Associated with the feed of the disc file 21 is an intermittent turning of the disc 37. In the course of this, the distance between the pin 50 and the bolt 40 is reduced as a result of the spiral trace of the groove 48, and this causes a displacement of the slide 41 in the direction of the support 27. Thus with each step of the disc file in the peripheral direction there is associated a simultaneous displacement in the radial direction. In this manner the strips 22 are arranged spirally on the filing disc.

In the production of drum files, it is sufficient if the knife is displaced laterally in relation to the axis of the drum to such an extent that the tangent at the cylindrical surface of the drum forms an angle of about 30° with the horizontal as shown in Figure 17. The drum file 61 is mounted to rotate on a shaft 62 on the one hand and guided with the open end on a slot 63 in the tool holder 64. The latter is made in one piece with the bracket 65 which is provided with a bearing 66 for the shaft 62. This bearing is arranged for partial displacement in the guide 67 and rests against a step 70 while being subjected to the action of a spring 68 which rests against a projection 69.

The punch member, knife and counter-die are arranged in the tool holder 64 as described above and are connected to the press; corresponding parts are given the same reference numerals. A claw, which is not illustrated, provides for the intermittent feed of the drum in the manner described.

The method of operation of this device is the same as that of the device shown in Figures 14 to 16. In order to enable the drum to be lifted when the claw pulls the cutter 71 which has just been produced over the counter-die 30, the bearing 66 for the shaft 62 which carries the drum is made resilient at the top.

As can easily be seen, it is possible with the method of the invention, to make the cutting angle of the filing tool suit any particular requirements, a reduced inclination of the strips 2, 22, 71 being associated with a reduced cutting angle. If the gaps between the strips become too narrow as a result, this drawback is overcome by cutting out slits between the strips.

The actual strips 2, 22, 71 may be of any shape, e.g. they may be curved. They may also run radially or axially, or again they may deviate from the direction.

The filing plates for hand files are clamped in holders which provide a support at least for the marginal zones and have a fixed and a movable stop which cooperate with corresponding stops such as notches, bores and the like in the filing plates. The movable stop is preferably displaceable by turning the handle so that the filing plate which has been inserted can be gripped tightly.

We claim:

1. A method of forming a filing tool from a flat metal sheet comprising making a succession of cuts in the sheet in a direction oblique to the plane of the sheet to form a succession of narrow strips joined at their ends to the remainder of the sheet and of rhomboidal cross section having parallel planar side faces and longitudinal edges oblique to said side faces, and twisting said strips relative to the plane of the sheet to incline the strips at an acute angle to the sheet with the longitudinal edges of the strips extending outwardly beyond the opposite sides of the metal sheet and with the outermost extremity of each strip being the acute cutting edge formed by the intersection of the longitudinal edge with the outer side face of the strip.

2. A method of forming integral teeth of rasp-like character in a metal sheet for the production of a filing or abrading tool comprising severing through the sheet along spaced paired parallel lines of severance so as to separate tooth-forming portions from the sheet except at the opposite ends of said portions, the plane of each severance being inclined to the general plane of the sheet to provide acute angle cutting edges for each tooth, while simultaneously bending and twisting each tooth-forming portion about an axis between and parallel to each pair of lines of severance to cause each tooth-forming portion to lie in a plane inclined to the general plane of the sheet so that the cutting edge of each is disposed outward of, but parallel to, the adjacent surface of the sheet or plate.

3. A method of forming a filing tool from a flat metal sheet comprising making a succession of cuts in the sheet in a direction oblique to the plane of the sheet by means of a cooperating pair of cutter elements displaceable in a common plane inclined to the general plane of the sheet from opposite sides of the sheet to form a succession of narrow strips joined at their ends to the remainder of the sheet and of rhomboidal cross section having parallel planar side faces and longitudinal edges oblique to said side faces, and simultaneously twisting said strips relative to the plane of the sheet to incline the strips at an acute angle to the sheet with the longitudinal edges of the strips extending outwardly beyond the opposite sides of the metal sheet and with the outermost extremity of each strip being the acute cutting edge formed by the intersection of the longitudinal edge with the outer side face of the strip.

4. A method of manufacturing an abrading or filing tool of the kind comprising a metal plate having a plurality of strip-like teeth formed integrally in the plate and connected to the plate only by their ends and formed by cutting parallel pairs of slits in the plate and bending each tooth strip portion so defined so that it is inclined to the general plane of this plate, wherein the plate is disposed obliquely to the direction of motion of the cutter means effecting the slitting of the plate whereby teeth of rhomboidal cross section and having acute angled cutting edges are formed and wherein the angle of inclination of each twisted tooth portion to the plane of the adjacent surface of the plate is less than the angle of the cutting edge.

5. A method of forming a filing tool from a flat metal sheet comprising making a succession of cuts in the sheet in a direction oblique to the plane of the sheet at an angle of approximately 60° to form a succession of narrow strips joined at their ends to the remainder of the sheet and of rhomboidal cross section having parallel planar side faces and longitudinal edges oblique to said side faces, and twisting said strips relative to the plane of the sheet to incline the strips at an acute angle to the sheet of approximately 20° to 30° with the longitudinal edges of the strips extending outwardly beyond the opposite sides of the metal sheet and with the outermost extremity of each strip being the acute cutting edge formed by the intersection of the longitudinal edge with the outer side face of the strip.

6. A method of forming a filing tool from a flat metal disc comprising making a succession of cuts generally radially of the disc in a direction oblique to the plane of the disc to form a succession of narrow strips joined at their ends to the remainder of the disc and of rhomboidal cross section having parallel planar side faces and longitudinal edges oblique to said side faces, and twisting said strips relative to the plane of the disc to incline the strips at an acute angle to the disc with the longitudinal edges extending outwardly beyond the face of the strip and with the outermost extremity of each strip being the acute cutting edge formed by the intersection of the longitudinal edge with the outer side face of the strip.

References Cited in the file of this patent
UNITED STATES PATENTS

| | | |
|---|---|---|
| 838,289 | Weber | Dec. 11, 1906 |
| 1,625,836 | Tanguay | Apr. 26, 1927 |
| 2,058,912 | Reid | Oct. 27, 1936 |